Nov. 27, 1962   C. M. AILMAN ET AL   3,066,296
FILM TIME MARKING METHOD AND SYSTEM
Filed Nov. 30, 1956   4 Sheets-Sheet 3

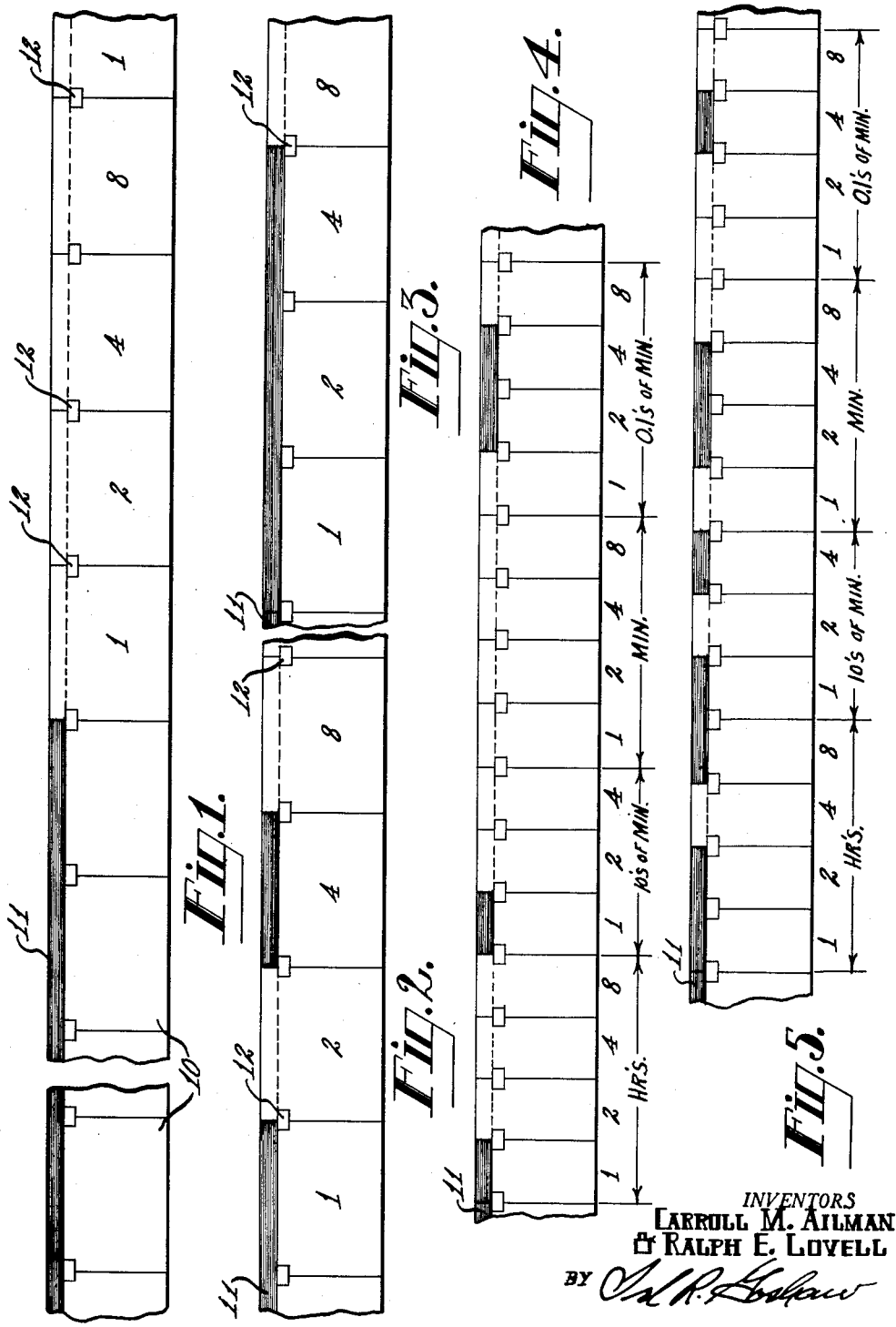

INVENTORS
CARROLL M. AILMAN &
RALPH E. LOVELL
BY
ATTORNEY

Nov. 27, 1962
C. M. AILMAN ET AL
3,066,296
FILM TIME MARKING METHOD AND SYSTEM
Filed Nov. 30, 1956
4 Sheets-Sheet 4
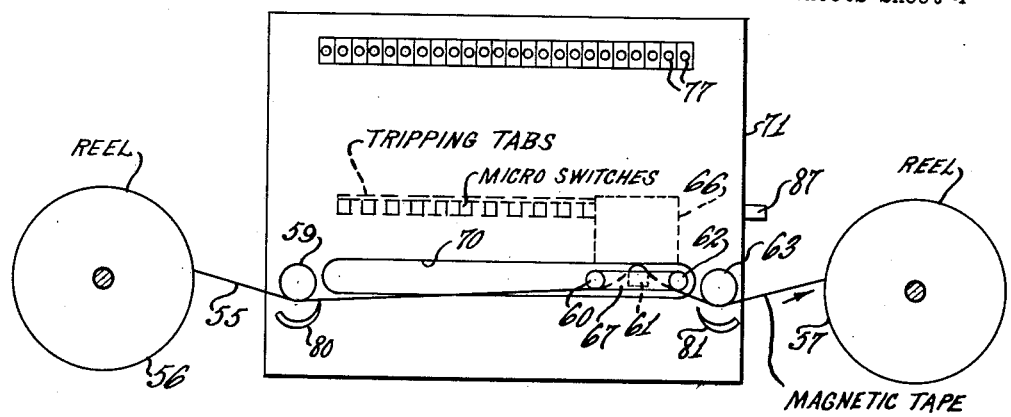
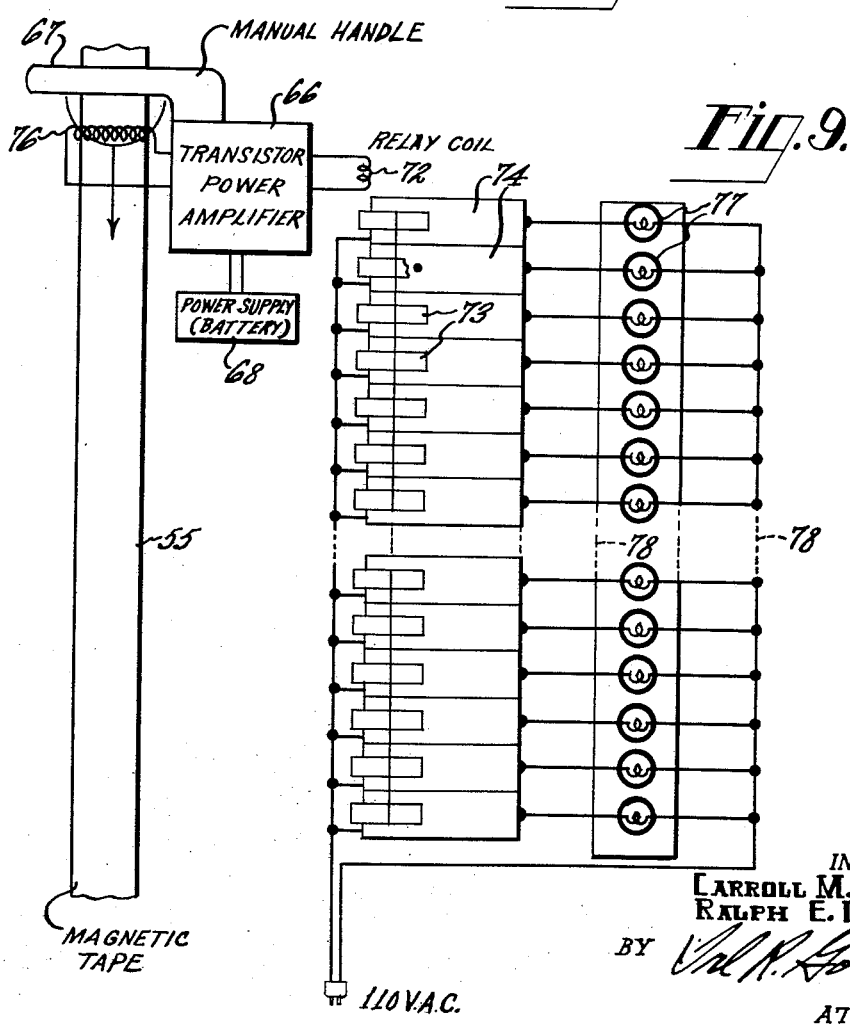
INVENTORS
CARROLL M. AILMAN &
RALPH E. LOVELL
BY
ATTORNEY

United States Patent Office 3,066,296
Patented Nov. 27, 1962

3,066,296
FILM TIME MARKING METHOD AND SYSTEM
Carroll M. Ailman and Ralph E. Lovell, Los Angeles, Calif., assignors to Radio Corporation of America, a corporation of Delaware
Filed Nov. 30, 1956, Ser. No. 625,395
8 Claims. (Cl. 346—20)

This invention relates to marking, synchronization, and timing systems, and particularly to a system for identifying or correlating two or more motion picture and sound films by actual time designations.

In the production of motion pictures for theater projection or television transmission, the concomitant sound for a motion picture may be on a separate film from that of the picture, and synchronization or start marks are used both to line up the beginning of the films for projection and television transmission and to combine a sound and picture film into a composite print. The present system not only provides such marks but also provides a periodic code marking for either a photographic or magnetic film which indicates the exact time the mark was applied to the film. By the use of such a time mark, two films may be not only started or synchronized for simultaneous projection and reproduction but may also be correlated at substantially any point along the length of the films. In television transmission where a film must be transmitted within a predetermined length of time, such timing marks are valuable in determining the length of time in which a film can be transmitted so that the speed of the film or films may be increased or decreased if required.

The type of mark used is in the form of a binary code using four groups of information which may be readily interpreted as time from visible markings on a photographic film or from a reader of magnetic film.

The principal object of the invention, therefore, is to facilitate the correlation of two or more motion picture films or picture and sound films.

Another object of the invention is to provide an improved method of and system for marking a plurality of motion picture and/or sound films.

A further object of the invention is to provide a binary code marking for picture and/or sound films which periodically indicates the time the film is marked, the marking being applicable to both photographic and magnetic films.

A better understanding of this invention may be had from the following detailed description when read in connection with the accompanying drawings, in which:

FIG. 1 is a view of a film section showing a reference signal before the application of the time designation;

FIG. 2 is a view of a film section showing the manner of applying a time designation;

FIG. 3 is a view of another film section showing the manner of applying a time designation;

FIG. 4 is a view of a film section showing a definite time designation;

FIG. 5 is a view of another film section showing a definite time designation;

FIG. 8 is an elevational view showing a reader of time designations on magnetic film;

FIG. 9 is a diagrammatic plan view of the reader shown in FIG. 8; and

Figure 6:
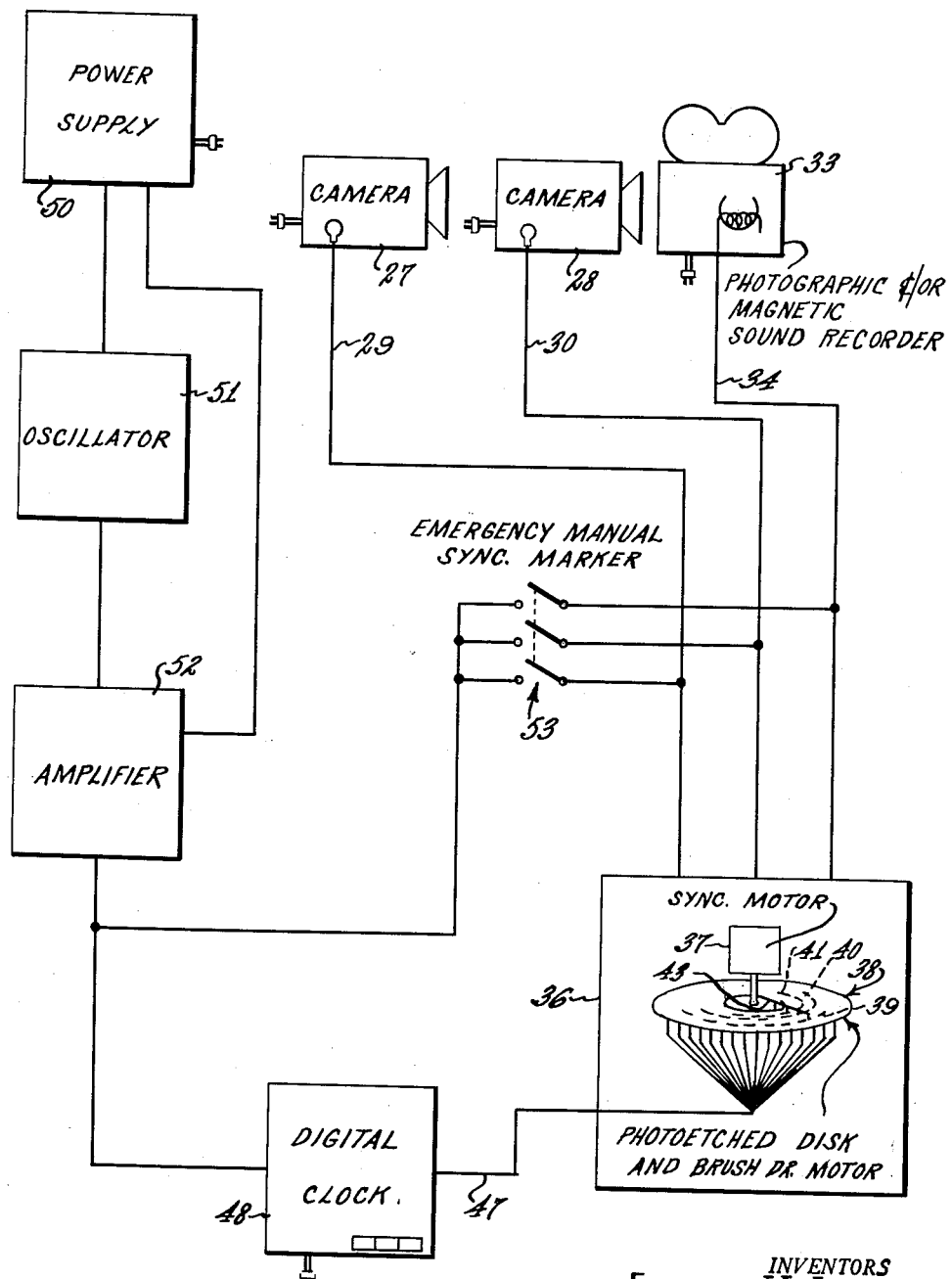
FIG. 6 is a diagrammatic view of a system for applying the time designations.

Referring now, to FIGS. 1 to 5, inclusive, FIG. 1 shows a strip of film 10 showing a reference or start signal 11 applied to a predetermined number of frames which may be eight, ten, or any selected number of frames. The reference signal 11 may be produced by the exposure of a lamp if the film is photographic or may be applied by a magnetic head if the film is magnetic, the area to which the signal is applied being between the sprocket holes 12 and the edge of the film. If unperforated magnetic tape is used, the time designation may be applied along either edge of the film. After a certain number of frames have been marked, the timing designations may then be applied as shown in FIGS. 2, 3, 4 and 5.

The time designations are applied in four groups, the first group being the first four frames, which may be serially assigned the numerals 1, 2, 4 and 8. The second group is composed of three frames, which may be assigned the numerals 1, 2, and 4, although four frames may also be used for this second section of the marking, the fourth frame being unnecessary in this particular type of system. The third section is made up of four frames which may be assigned the numerals of 1, 2, 4 and 8. The fourth section is the same as the first and third sections. There is, thus, provided a sequence of frames which may be marked either photographically or magnetically, and which will indicate the hour, minutes, and seconds at which the designation is applied. The application of the designations may occur at any desired interval, such as six seconds.

To illustrate how these markings may be applied and interpreted, FIG. 2 shows a marked frame to which the numeral 1 has been assigned, and a marked frame to which the numeral 4 has been assigned. These marks may be produced by a lamp exposing the edge of a photographic film over the height of a frame or by an energized magnetic head over the same or a preselected length of magnetic film. Thus, by adding the numbers assigned to these two frames in the section shown in FIG. 1, the sum of 5 is obtained. In this manner, combinations of the numbers assigned to the four frames in any section will provide any number up to and including 15. In FIG. 3, frames to which numerals 1, 2 and 4 have been assigned have been marked, which would provide a total count of 7.

Referring, now to FIG. 4, in which a film section showing an actual time mark is illustrated, the first four frames indicate hours, and since the frame to which the numeral 1 has been assigned is marked, the hour would be one o'clock. The next three frames indicate tens of minutes, so the frame marked 1 indicates 10 minutes. The third section, which indicates minutes of 1 through 8, has not been marked, so the indicated time so far is 1 hour and 10 minutes. In the fourth section, the frames to which numerals 2 and 4 have been assigned indicate seconds by tenths of minutes, and since the two frames assigned to numeral 6 are marked, the reading is 6/10 of 60, or 36 seconds. Thus, the marking shown in FIG. 4 indicates the time as 1 hour, 10 minutes, and 36 seconds.

To further illustrate the binary code marking, reference is made to FIG. 5. In this marking, the hour section of the designation indicates 1+2+8, or 11 hours. The tens-of-minutes section indicates 1+4 or 5 tens or 50 minutes, while the minute section indicates 2+4 or 6 minutes, so that the indicated time so far is 11 hours and 56 minutes. In the fourth section of the designation, the third frame assigned the numeral 4 is marked, which indicates 4/10 of 60 seconds or 24 seconds. Thus, the time shown on the section of film in FIG. 5 is 11 hours, 56 minutes, and 24 seconds.

From the above explanation, it can be seen that, by marking four sections of film in serial order, starting from a reference point, the exact time of application of the mark is obtained. Although the first or hour section has been shown as starting immediately at the end of the reference or start mark 11, which has a length of a predetermined number of frames, there may be a gap of one frame between the end of the start mark and the beginning of the first section if desired.

Figure 7:
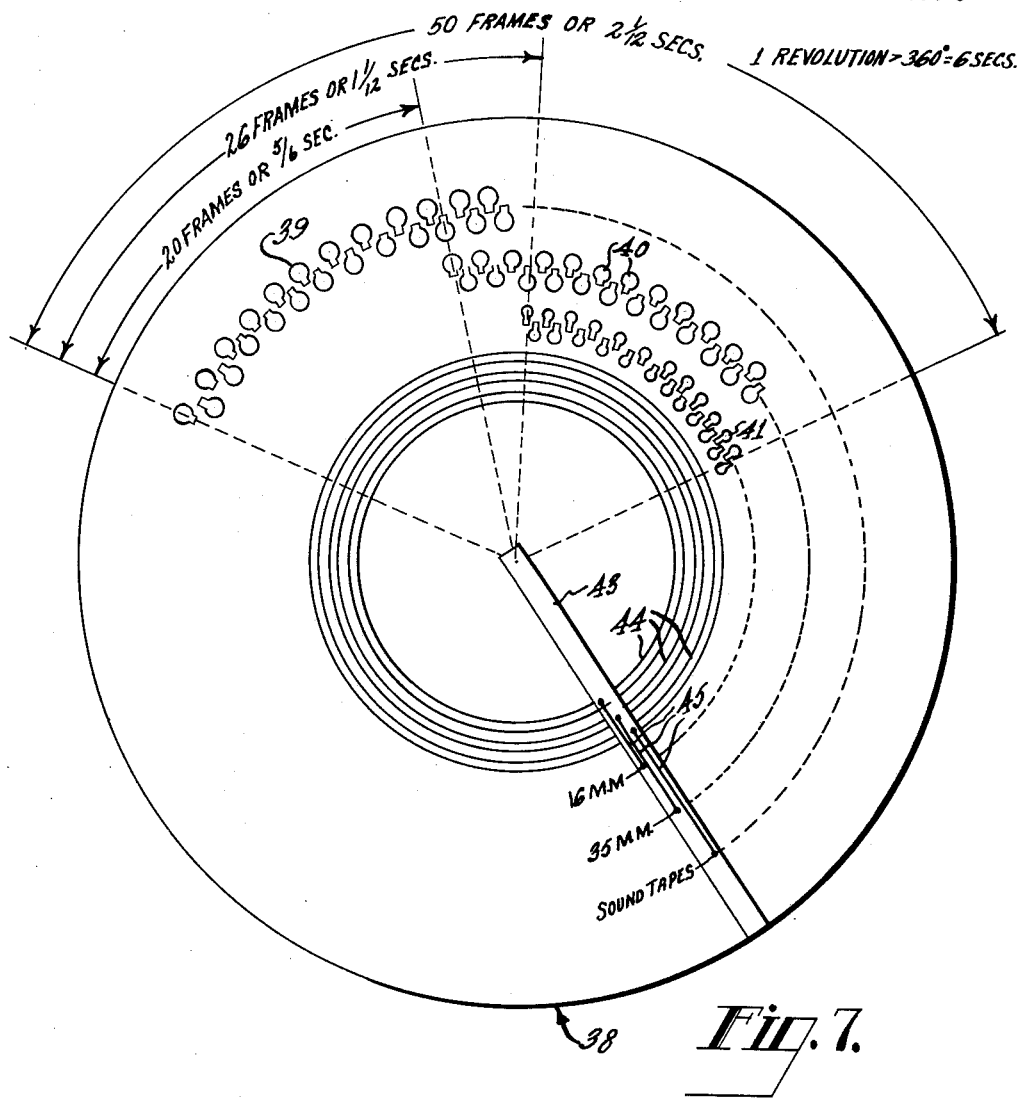
FIG. 7 is a plan view of the commutator used in the system of FIG. 6.

Referring, now, to FIGS. 6 and 7, two motion picture cameras 27 and 28 are shown connected to respective conductors 29 and 30. Also shown in FIG. 6 is a photographic and/or magnetic sound recorder 33 connected to a conductor 34. The cameras may photograph a live scene or a scene on a television kinescope. The films in these cameras and recorder are marked with the type of time designations just described.

The conductors 29, 30, and 34 are connected to a commutating or distributing device 36 having a brush driving motor 37 and a ¼ inch thick, glass filled, 2 oz., copper clad, epoxy resin disc 38 photoetched with 50 mm. rhodium over nickel flash. Other suitable types of commutators may also be used. Etched on the top surface of the disc 38 are three rows of contact areas 39, 40, and 41. The middle row of contacts 40 is approximately 2.5 degrees of an arc in width, which corresponds to $\frac{1}{24}$ of a second, or to one frame of film advanced at the speed of 90 feet per minute. The row of contacts 39 may be spaced for unperforated sound tapes, while row 41 may be spaced for 16 mm. film. Driven by the motor 37 is a wiper arm 43 having respective brushes 45 which make contact with three slip rings 44 connected to conductors 29, 30, and 34 and the rows of contact elements 39, 40, and 41 aligned therewith. Thus, connections are made between the slip rings and the contact elements in serial order as the wiper arm 43 is rotated.

Referring, again, to FIG. 6, the rows of contacts on disc 38 are connected over a cable 47 to a digital clock 48, which may be a Model LD–1500 manufactured by the Lawson Time Mfg. Co. This digital clock may send to the commutator the binary code once every six seconds. The code is transmitted from the clock to the contacts simultaneously and then distributed to the cameras in serial order, the code being applied in any period from ⅔ second to 4 seconds, depending on the length and design of the reference or start mark signal, during which time there is no change in the output binary pattern. To provide a signal for the clock 48, a power supply 50 is connected to an oscillator 51, which may have an output frequency of 400 cycles per second at .07 volt. The power supply is also connected to an amplifier 52, the latter being connected to the digital clock 48. For emergency manual marking, the output of amplifier 52 may be connected through a manual switch 53 to the conductors 29, 30, and 34 feeding the cameras and sound recorder.

Figure 10:
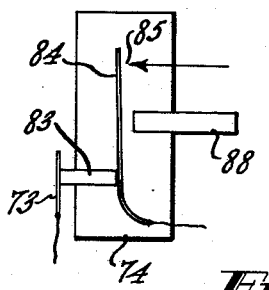
FIG. 10 is a detail view of the microswitch used in the reader of FIGS. 8 and 9.

The above marking system will thus apply to a plurality of films the type of time designation indicated in FIGS. 1 to 5, inclusive, the same mark being applied to photographic film by a lamp exposing the edge of the film, and to a magnetic film by a magnetic head in contact with the film. After the photographic film is developed, the marks may be read directly starting from the end of the reference signal 11, while the magnetic film is applied to a reader, which will now be described in connection with FIGS. 8, 9, and 10. Although other forms of readers may be used, such as shown in U.S. Patent No. 2,528,699, of November 7, 1950, a preferred reader for magnetic film is of the type shown in FIGS. 8 and 9.

In FIG. 8, a magnetic film 55 is shown between a reel 56 and a reel 57, the reels being either hand operated or motor driven. The film may be advanced in either direction between the reels. The film passes under a guide roller 59 on a panel 71, under a guide roller 60, over a magnetic head 61, and under guide rollers 62 and 63. The rollers 60 and 62 and the head 61 are mounted on a carriage together with an amplifier 66, having a manual handle 67, a power supply 68, a relay coil 72, and a magnetic pickup head 76. The carriage supporting the amplifier and handle is mounted in a slot 70 of panel 71, and may be moved along the slot on a track or guides or in any other suitable manner. The output of the amplifier is impressed on relay coil 72 which will pass over the ends of pivoted tripping tabs 73 positioned over a plurality of microswitches 74, one of which is shown in detail in FIG. 10. The microswitches 74 are shown in a continuous line for clarity, it being understood that they may be arranged in any suitable pattern. The input to the amplifier 66 is the output of the magnetic head 76.

The microswitches 74 are connected through a corresponding number of lamps 77 connected to an energy source such as 110 volt A.C. house supply. By the broken lines 78, the number of microswitches and lamps may be varied to correspond to the number of frames on which markings may be applied. The lamps 77 are shown mounted on the panel 71 for easy observation by the operator.

To operate the reader, it is only necessary for the operator to move the film with the reels 56 and 57 until the reference mark 11 indicates the beginning of the first section of the code designation which is positioned at the magnetic head 61. Two clamps 80 and 81 are then applied to hold the film firmly between the guide rollers 59 and 63. The operator then grasps the handle 67 and moves the carriage along the slot 70. As the head moves over each magnetized frame, the relay 72 will be energized and the tripper tab over which the relay passes will be actuated to move a plunger 83. The plunger will move an armature 84, causing it to make its contacts 85, which will then lock in position (see FIG. 10). Such a microswitch is standard equipment, and a suitable unit is Model YZRX manufactured by the Micro Switch Company. When the carriage has transported the relay coil over the length of film in front of the slot 70, lamps corresponding to the magnetized frames will be energized and the time may be read from the lamps, as described above. After the time has been determined, a reset handle 87 will operate all the reset plungers, such as the one shown at 88 in FIG. 10, to reset all the switches for the next reading.

There is provided, therefore, a time marking system which will apply actual time designations periodically on both photographic and magnetic films, the markings being directly readable upon development of the photographic film and directly readable when the magnetic film is passed through a reader as described above. Thus, two or more films may be accurately correlated at any point along their length without referring back to the beginning of a reel or roll of film, the actual time of photographing or recording being shown on the films.

We claim:

1. A marking system for a film comprising a signal generating source, a clock mechanism connected to said source for simultaneously making a plurality of contacts according to the time of day and on which the signal from said source can be simultaneously impressed, a distributor having a plurality of serially arranged contact elements connected to said plurality of contacts of said clock mechanism, means adapted to continuously advance said film, means adapted to periodically mark said film as it is continuously advanced, and connecting means between said contact elements of said distributor and said last-mentioned means for serially and directly applying the signal from said source to said last-mentioned means in accordance with the contacts made by said clock, said connecting means including circuits from said signal generating source through said simultaneously made contacts and said serially arranged contact elements to said marking means.

2. A marking system in accordance with claim 1 in which said film is a photographic film and said marking means is a light source adapted to expose said photographic film upon energization by the signal from said source.

3. A marking system in accordance with claim 1 in which said film is a magnetic film and said marking means is a magnetic head adapted to magnetize said magnetic film upon energization by the signal from said source.

4. A marking system for a magnetic film comprising an electrical oscillator, a digital clock for simultaneously making a plurality of contacts according to the time of day, a distributor having a plurality of contacts connected to said plurality of contacts of said clock, means for continuously advancing said film and a magnetic head for magnetizing said film as said film is advanced, said distributor having a rotatable wiper for serially connecting the plurality of contacts thereof to said head, the signal from said oscillator being directly applicable to said head through said clock contacts and said distributor contacts.

5. The method of periodically marking a film with a series of groups of markings indicating the time of day comprising applying said series of groups of marks from a common signal source in serial order to said film while said film is advanced continuously, each mark being of the same type and each group designating a period of time in terms of time divisions, such as hours, minutes, and seconds, the number and spacing of said marks in each group providing an indication of the total of hours, minutes, and seconds at the time said marks were applied, said marks being reproducible from said film when stationary.

6. The method in accordance with claim 5 in which said marks are applied by exposing a moving photographic film to a series of spaced, variable length and discontinuous light flashes at periodic intervals.

7. The method in accordance with claim 5 in which said marks are applied by periodically magnetizing a moving magnetic film in a series of spaced, various length and discontinuous magnetizations in accordance with the time of day said magnetizations are applied.

8. A record medium having time designating markings thereon, said medium comprising an elongated member having successive groups of discrete areas thereon, the individual areas of each group having assigned time designating values according to a prescribed code, said assigned values of areas in each of said groups being different from those of any other group of said areas and bearing a predetermined relation to each other and to the areas of the others of said groups in terms of hours and fractions thereof, a first marking on said member in advance of a first of said groups constituting a starting time reference marking, and additional markings on said member alongside selected ones of said areas following said reference marking, said additional markings having the time values of the respective ones of said areas alongside which they are disposed and cumulatively indicating a period of time following the time of said reference marking.

References Cited in the file of this patent

UNITED STATES PATENTS

| | | |
|---|---|---|
| 1,394,565 | Long | Oct. 25, 1921 |
| 2,120,378 | Tauschek | June 14, 1938 |
| 2,549,071 | Dusek et al. | Apr. 17, 1951 |
| 2,610,226 | Klaasse et al. | Sept. 9, 1952 |
| 2,646,334 | Marchand | July 21, 1953 |
| 2,650,830 | Potter | Sept. 1, 1953 |
| 2,713,533 | Forellad | July 19, 1955 |
| 2,730,699 | Gratian | June 10, 1956 |
| 2,786,895 | Rettinger | Mar. 26, 1957 |
| 2,806,901 | Ferguson | Sept. 17, 1957 |
| 2,929,669 | Madeley et al. | Mar. 22, 1960 |
| 2,932,547 | Swan | Apr. 12, 1960 |